US005837084A

United States Patent [19]

Barss

[11] Patent Number: 5,837,084

[45] Date of Patent: Nov. 17, 1998

[54] METHOD OF MAKING A SINGLE-CELL HONEYCOMB FABRIC STRUCTURE

[75] Inventor: James L. Barss, Porter Corners, N.Y.

[73] Assignee: Comfortex Corporation, Watervliet, N.Y.

[21] Appl. No.: 528,456

[22] Filed: Sep. 14, 1995

[51] Int. Cl.[6] .............................. B32B 31/18; B32B 3/12

[52] U.S. Cl. .......................... 156/197; 150/204; 150/250; 150/267; 150/292; 160/84.05; 428/116; 428/188

[58] Field of Search .................................... 156/197, 199, 156/204, 250, 267, 474, 292; 428/116, 118, 188; 160/84.05

[56] References Cited

U.S. PATENT DOCUMENTS

| | | | |
|---|---|---|---|
| D. 352,856 | 11/1994 | Ford | D6/575 |
| 4,019,554 | 4/1977 | Rasmussen | 160/84 R |
| 4,288,485 | 9/1981 | Suominen | 482/116 |
| 4,307,768 | 12/1981 | Anderson | 160/84 R |
| 4,347,887 | 9/1982 | Brown | 160/368 R |
| 4,450,027 | 5/1984 | Colson | 156/193 |
| 4,625,786 | 12/1986 | Carter et al. | 160/84 R |
| 4,631,217 | 12/1986 | Anderson | 428/118 |
| 4,677,012 | 6/1987 | Anderson | 428/116 |
| 4,685,986 | 8/1987 | Anderson | 156/197 |
| 4,732,630 | 3/1988 | Schnebly | 156/64 |
| 4,795,515 | 1/1989 | Kao et al. | 156/197 |
| 4,849,039 | 7/1989 | Colson et al. | 156/197 |
| 4,861,404 | 8/1989 | Neff | 156/204 |
| 4,871,006 | 10/1989 | Kao et al. | 160/84.1 |
| 4,974,656 | 12/1990 | Judkins | 160/84.1 |
| 5,015,317 | 5/1991 | Corey et al. | 156/197 |
| 5,043,038 | 8/1991 | Colson | 156/193 |
| 5,043,039 | 8/1991 | Swiszcz | 156/197 |
| 5,152,647 | 10/1992 | Sewell | 428/116 |
| 5,160,563 | 11/1992 | Kutchmarek et al. | 156/204 |
| 5,482,750 | 1/1996 | Colson et al. | 428/116 |
| 5,525,395 | 6/1996 | Huang | 428/188 |

*Primary Examiner*—Michele K. Yoder
*Attorney, Agent, or Firm*—Rader, Fishman & Grauer

[57] ABSTRACT

An improved method of making a single-cell honeycomb fabric structure includes forming a double-cell honeycomb fabric structure from a single continuous length of foldable material, and removing parts of the cells defining a face of the double-cell honeycomb structure to obtain the desired single-cell honeycomb structure having folded outwardly-extending pleats on one face and tabbed outwardly-extending pleats on the other face.

7 Claims, 2 Drawing Sheets

METHOD OF MAKING A SINGLE-CELL HONEYCOMB FABRIC STRUCTURE

TECHNICAL FIELD

The present invention relates to an improved method of making a single-cell honeycomb structure out of fabric material, as may be used in making a window shade.

BACKGROUND OF THE INVENTION

The prior art has long recognized the advantages of so-called “honeycomb” or collapsible cellular structure made of fabric as an alternative window treatment or window shade for residential and commercial applications. Depending upon their specific construction, such fabric structures are known to provide such benefits as improved insulation, light filtering, hidden draw cords, the availability of different colors or patterns on opposite faces, and mechanical integrity for specialty applications, e.g., providing increased lateral stiffness useful in nonvertical applications.

Generally speaking, multiple-cell honeycomb fabric structures, i.e., fabric structures having two or more vertical stacks of tubular cells, provide more of these desirable characteristics than do single-cell honeycomb fabric structures, i.e., fabric structures formed of a single vertical stack of tubular cells. Multiple-cell honeycomb structures, however, inherently require greater amounts of base material in their manufacture than do single-cell honeycomb structures. Moreover, multiple-cell honeycomb structures tend to have a higher spring coefficient and, hence, a multiple-cell honeycomb shade comprising a given number of cells will drop less, i.e., will cover less window area, than will a single-cell honeycomb shade comprising the same total number of cells. As a result, the material costs of providing a multiple-cell honeycomb shade for a given window application are substantially greater than that of providing a single-cell honeycomb shade.

Unfortunately, known single-cell honeycomb fabric structures are typically fabricated either as a laminated stack of individually-formed fabric tubes as taught by Schnebly in U.S. Pat. No. 4,732,630 or cut from a multiple-cell honeycomb structure itself formed by laminating together stacked sheets of fabric as taught by Siominem in U.S. Pat. No. 4,288,485. As such, known single-cell honeycomb fabric structures are significantly more costly to fabricate than certain multiple-cell honeycomb fabric structures which, according to one known process taught by Corey et al in U.S. Pat. No. 5,015,317, may be advantageously formed from a single continuous length of foldable material which is creased, alternatingly transversely folded upon itself, accumulated in a vertical stack, and bonded to itself along transversely extending bond lines to form an array of transversely extending tubular cells.

In an attempt to capitalize on the advantages of the process taught in U.S. Pat. No. 5,015,317, the specifics of which are hereby incorporated herein by reference, the prior art has proposed deriving a pair of single-cell honeycomb fabric structures from a triple honeycomb fabric structure, wherein the triple honeycomb structure is manufactured in the manner outlined above, whereupon the triple honeycomb structure is itself cut in half as by passing a rotary knife along the entire length of each of its intermediate cells to obtain the two desired single-cell honeycomb structures. It has also been proposed to reduce the size of the intermediate cells in the triple-cell honeycomb “mother” structure to reduce waste fabric in the event that the cutting process removes a length of material from the middle of the triple-cell honeycomb, as might occur when seeking to improve the appearance of the cut face of each resulting single-cell honeycomb structure as by removing intermediate cell material up to the nearest bond line. Indeed, by removing the intermediate cell material, each of the resulting single-cell honeycomb structures will be seen to have one face whose outwardly-extending pleats are defined by folded and/or creased material and one face whose outwardly-extending pleats are each defined by two terminal edges of material bonded together to create a “tab.” Unfortunately, the difficulty associated with splitting a triple-cell honeycomb fabric structure cleanly in half in accordance with this proposed hybrid method would likely eliminate the cost savings enuring from use of the process taught in U.S. Pat. No. 5,015,317.

Accordingly, what is needed is a method of making a single-cell honeycomb structure which uses a single continuous length of foldable fabric material and yet avoids the complications inherent to the prior art.

SUMMARY OF THE INVENTION

Under the present invention, a method of making a single-cell honeycomb structure from a single continuous length of foldable fabric material begins with coating portions of both faces of the material with an adhesive in a predetermined pattern so as to provide narrow stripes of adhesive on each side of the material, each adhesive stripe extending transversely to the material’s length. The thus-coated material is then folded upon itself in alternatingly opposite directions along a plurality of fold lines, each of which likewise extend transversely to the material’s length, and each of which is positioned relative to the pattern of adhesive stripes such that each resulting adjacent pair of alternately folded lengths of the material includes at least one adhesive stripe on each face of the material.

Further in accordance with the present method, the thus alternatingly folded lengths of the material are then accumulated in a vertical stack, with the alternating folds in the material defining the first and second sides of the stack, respectively. In this manner, each adhesive stripe on the accumulated (stacked) material is placed in touching contact with the now opposed adjacent length of the material, whereupon adjacent alternatingly folded lengths of material are joined together along those adhesive stripes. Depending upon the type of adhesive with which the material is initially coated, an adhesive-curing step may then be performed to permanently join together the opposed alternatingly folded lengths of the material.

Once joined, the alternatingly folded lengths of the material cooperate to define a vertically-collapsed double honeycomb fabric structure having two staggered columns of tubular cells, with each tubular cell extending transversely to the material’s original length dimension. Significantly, since each tubular cell borders a side of the stack, each tubular cell in the double-cell honeycomb fabric includes a transverse fold in the material.

In order to obtain the desired single-cell honeycomb structure, the alternatingly folded material from the first side of the stack adjacent the folds therein is removed as by milling, planing or cutting the first side of the stack with a suitable cutting tool such as a rotary saw, band saw or knife, preferably up to (or, perhaps, even into, but never completely removing) the adhesive stripe on the first face of the material nearest the first side of the stack. In this manner, the cells of the vertically-collapsed double honeycomb located on the first side of the stack are themselves partially destroyed, thereby exposing terminal edges of material bonded together by the adhesive stripe. The remaining cells on the second side of the stack form the desired single-cell honeycomb structure, with its original outwardly-extending folded pleat on one of its faces and its newly-formed outwardly-extending "tabbed" pleat on the other of its faces.

In accordance with another feature of the present invention, the pattern of adhesive stripes relative to the fold lines is preferably such that the distance between each adhesive stripe on the first face of the material and the nearest fold line is substantially less than the distance between each adhesive stripe on the second face of the material and the nearest fold line. The tubular cells on the first side of the stack are thus substantially smaller than the tubular cells on the second side of the stack. In this manner, the amount of material removed from the first side of the stack during the removal step is minimized to further reduce material costs for fabricating the resulting single-cell honeycomb structure.

Further in accordance with the present invention, the pattern of adhesive stripes relative to the fold lines is such that a pair of narrow closely-spaced transverse stripes is provided on the second face of the material for each adjacent pair of alternatingly folded lengths of the material. The closely-spaced pairs of adhesive stripes on the second face of the material ultimately serve to vertically join together each of the tubular cells of the resulting single-cell honeycomb structure. The closely-spaced pairs of adhesive stripes on the material's second face further act to guide a drill bit or other suitable tool when subsequently forming vertical passages through the stack, which passages are adapted to thereafter receive draw cords to assist collapse of the resulting single-cell honeycomb shade. While the vertical passages may be formed either before or after the removal step, the vertical passages are most preferably formed prior to the removal step so as to take advantage of the greater stability inherent to the pre-removal stack.

DETAILED DESCRIPTION OF THE PREFERRED EMBODIMENT(S)

Figure 1:
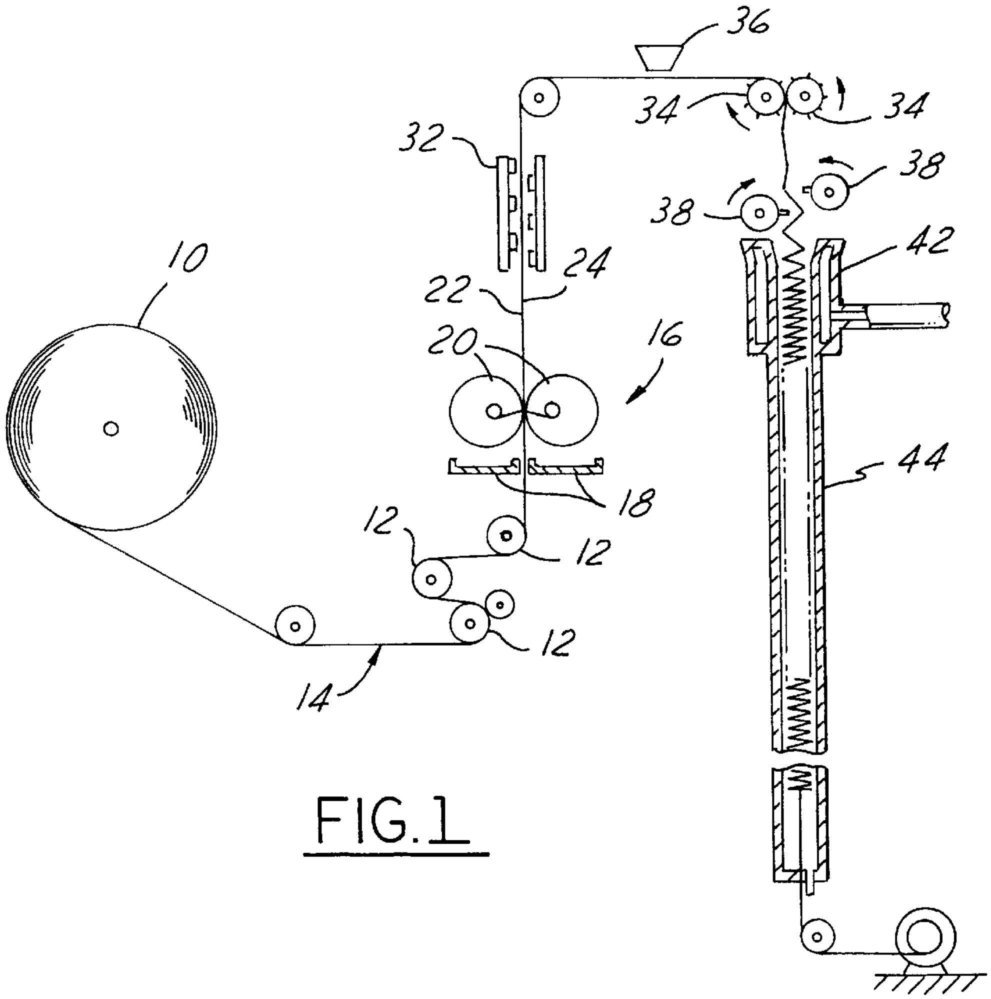
FIG. 1 is a schematic diagram of an exemplary apparatus for accumulating a stack of alternatingly folded lengths of a single continuous length of material in accordance with the present invention.
Figure 2:
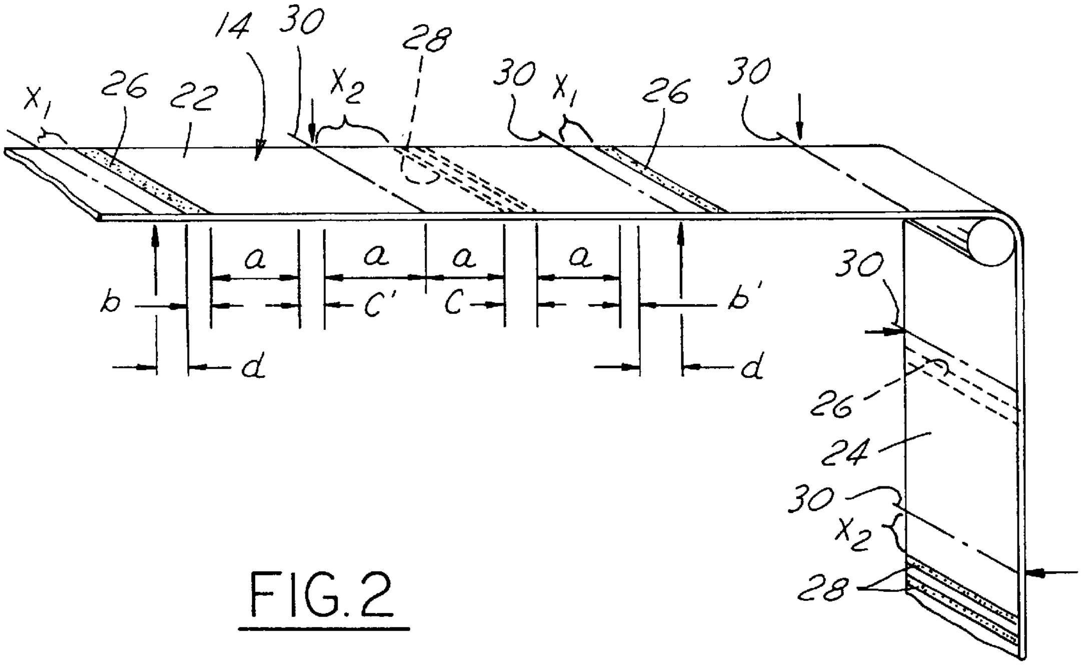
FIG. 2 is a partial view in perspective of the single continuous length of material with portions of both faces coated with an adhesive in a predetermined pattern which includes narrow stripes extending transversely to the material's length.

Referring to FIG. 1, in accordance with a preferred method for practicing the present invention, a supply roller 10 feeds a single continuous length of a foldable material 14 through a series of tensioning rollers 12 to a screen printing station 16 comprising drip trays 18 and screen printing rollers 20 with which portions of both faces 22,24 of the material 14 are coated with an adhesive in accordance with a predetermined pattern. As seen in FIG. 2, the pattern preferably includes narrow stripes extending transversely to the material's length, such that each face 22,24 of the material 14 is respectively provided with a repeating pattern of transversely-extending adhesive stripes 26,28. FIG. 2 further shows the relative locations of the transverse fold lines 30 about which the material 14 will be subsequently creased and folded in the manner further described below, along with arrows indicating the direction in which each fold line 30 is displaced when folded. It is noted that the present invention contemplates feeding the material 14 through a second screen printing station (not shown) to impart a desired color or pattern to one or both faces 22,24 of the material 14, preferably prior to coating both faces 22,24 with the adhesive stripes 26,28 in the first screen printing station 16.

Figure 3:
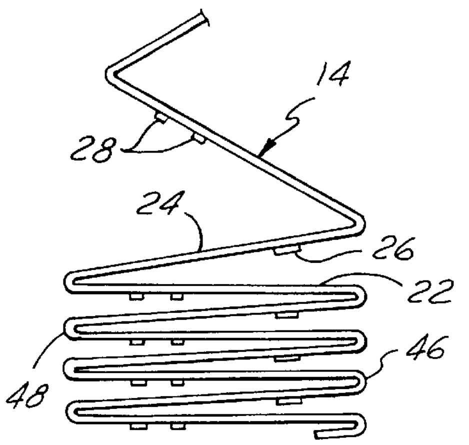
FIG. 3 is an end view of a stack of alternatingly folded lengths of material accumulating in the system shown in FIG. 1, with the thickness of the adhesive stripes on the material being enlarged for clarity.

Returning to FIG. 1, after the adhesive stripes 26,28 are partially cured as by passing the coated material 14 through a curing station 32, the thus-coated continuous length of material 14 is then passed through a pair of creasing rollers 34 which are synchronized with the pattern of adhesive stripes 26,28 as through use of a phase reader 36 so as to impart a permanent crease in the appropriate direction along each fold line 30. In a preferred creasing structure, a series of belt-track assemblies is employed in place of the creasing rollers 34, as illustrated in FIGS. 11–15 of U.S. Pat. No. 5,135,461. The coated and creased material 14 is then folded upon itself along the fold lines 30 in alternatingly opposite directions as with the aid of rotating air knives 38. As seen in FIGS. 2 and 3, each fold line 30 is positioned relative to the pattern of adhesive stripes 26,28 such that each resulting adjacent pair of alternately folded lengths of the material includes at least one adhesive stripe 26,28 on each face 22,24 of the material 14. As will be further appreciated upon reference to FIGS. 5 and 6, FIG. 2 further delineates the length portions of the material 14 which will ultimately comprise the respective "ligaments" and bonded portions of the cells forming the single-cell honeycomb structure 40 manufactured in accordance with the present invention.

The alternatingly folded lengths of material 14 are then accumulated in a batcher 42 to obtain a stack 44 whose first and second sides 46,48 are defined by alternating folds of material 14. An end view of a stack 44 of alternatingly folded lengths of material 14 accumulating within the batcher 42, with the thickness of the adhesive stripes 26,28 on the respective faces 22,24 of the material 14 enlarged for clarity, is illustrated in FIG. 3.

The resulting accumulated stack 44 of alternatingly folded lengths of the material 14 is then removed from the batcher 42 and the adhesive stripes 26,28 finally cured at a final curing station (not shown) to permanently join together the alternatingly folded lengths of the material 14. In this regard, it is noted that, while the adhesive may preferably comprise a urethane polyester slurry requiring a thermal cure and, hence, is preferably only partially cured during the coating operation, the present invention contemplates use of an adhesive which operates to permanently join together the alternatingly folded lengths of the material 14 during the accumulation step without requiring an additional curing step.

Figure 4:
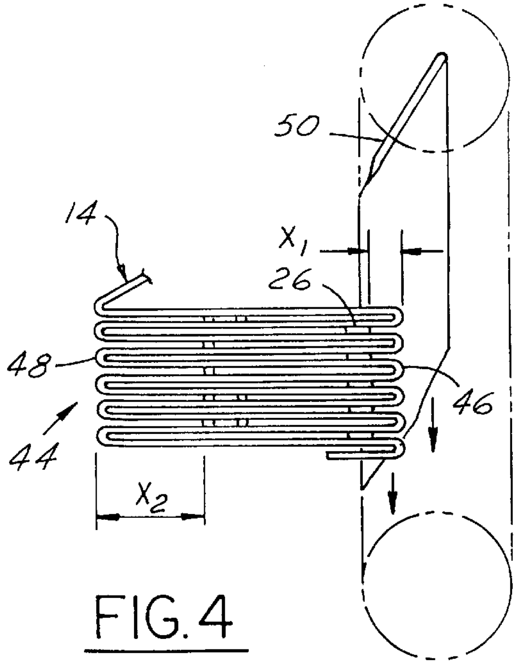
FIG. 4 is an end view of the accumulated stack (with the thickness of the adhesive stripes again enlarged) immediately prior to removing portions of the alternatingly folded material on the first side of the stack with a smooth-bladed band saw.
Figure 5:
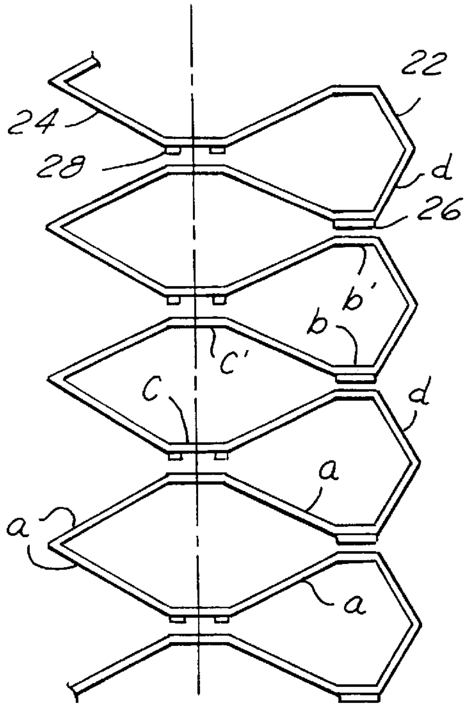
FIG. 5 is a conceptual end view of the accumulated stack immediately prior to the removal step as it might look were it fully expanded to demonstrate the intermediate double-cell honeycomb structure made from a single continuous length of the material, with the adhesive stripes on both faces of the material further being shown with enlarged thickness and in spaced relation with the complementary portions of material with which they are joined to further demonstrate the relative positions of the adhesive stripes, the transverse folds and the resulting cells.

An end view of the resulting stack 44, now a vertically-collapsed double-cell honeycomb structure, is illustrated in FIG. 4, while a conceptual end view of the resulting stack 44 were it to be vertically expanded to demonstrate its double-cell honeycomb structure is shown in FIG. 5. The thickness of the adhesive stripes 26,28 as shown in FIGS. 4 and 5 is greatly enlarged in order to show the locations of the adhesive stripes 26,28 relative to each side 46,48 of the stack 44 (FIG. 4) and the manner in which the adhesive stripes 26,28 and folds cooperate to form each individual cell (FIG. 5), while the conceptual end view of the stack 44 shown in FIG. 5 fictionally illustrates the adhesive stripes 26,28 in spaced relation with the complementary portions of the material 14 with which they are actually joined to further demonstrate relative placement of the adhesive stripes 26,28 on the faces 22,24 of the material 14, respectively.

Returning to FIG. 4, the adhesive stripes 26 on the first face 22 of the material 14 are preferably positioned relatively nearer to the first side 46 of the stack 44 than the adhesive stripes 28 on the material's second face 24 are positioned relative to the second side 48 of the stack 44. Stated another way, the adhesive stripes 26,28 and the bonds resulting therefrom are offset a relatively lesser distance "$x_1$" from the stack's first side 46 and a relatively greater distance "$x_2$" from the stack's second side 48, respectively.

As illustrated in FIGS. 4 and 5, the alternatingly folded material defining the first side 46 of the stack 44 is then removed using a suitable planing, cutting or milling tool 50. By way of example, in a preferred method of practicing the invention, the material defining the first side 46 of the stack 44 is removed by planing or "skimming off" the stack's first side 46 using a smooth-bladed band saw whose blade 50 is disposed at a slightly acute angle to stack's first side 46, as illustrated in FIG. 4. Preferably, a sufficient amount of the material 14 is removed from the first side 46 of the stack 44 to expose terminal edges 52 of the material 14 themselves bonded together with an adhesive stripe 26, thereby providing a "tabbed" face 54 on the resulting single-cell honeycomb structure 40 as seen in FIG. 6.

It will be appreciated that the removal step according to the present invention improves over prior art processes in that only one "clean" tabbed face need be generated during the removal step, rather than requiring two opposed "clean" tabbed faces as when splitting the intermediate cells of a triple-cell honeycomb structure. Still further, the removal step of the present invention does not require novel apparatus for its execution, in that "clean" tabs may be achieved with a wide variety of readily available equipment including rotary saws, band saws and rotary knives.

Figure 6:
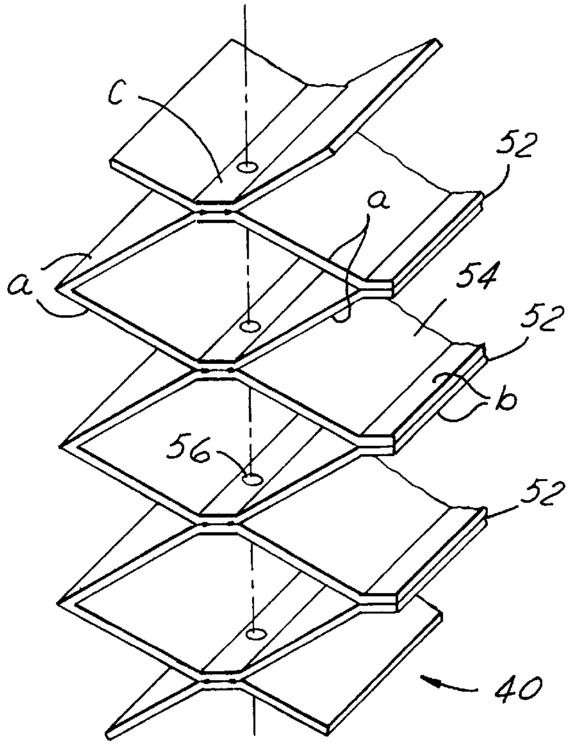
FIG. 6 is an isometric view of a partially expanded single-cell honeycomb fabric structure produced in accordance a preferred method of practicing the present invention.

As seen in FIGS. 5 and 6, the pattern of the adhesive stripes 26,28 is preferably positioned relative to the fold lines 30 such that the outwardly-extending ligaments "a" on each side of the resulting single-cell honeycomb structure 40 are approximately equal, i.e., the tubular cells of the resulting single-cell honeycomb structure 40 are substantially symmetrical about the central vertical plane of the cells. In this manner, the resulting single-cell honeycomb structure 40 provides maximum "drop," or maximum window area coverage, for a given quantity of material. As a further benefit of the present invention, the tabbed face 54 of the resulting single-cell honeycomb structure 40 further functions as an integral transverse structural element useful in special applications while further providing improved pleat definition at maximum drop.

To the extent that a different aesthetic appearance may be desired, such as greater pleat definition on the tabbed face of the resulting single honeycomb fabric 40 at maximum drop, the present invention permits formation of asymmetrical cells, i.e., cells whose outwardly-extending ligaments defining one of the fabric's faces are of noticeably different length than the outwardly-extending ligaments defining the resulting fabric's other face, simply by shifting the pattern of adhesive stripes 26,28 on the material 14 relative to the fold lines 30.

In the event that draw cords (not shown) are to be used in conjunction with the single-cell honeycomb fabric structure 40 shown in FIG. 6, the adhesive stripes 28 on the material's second face 24 which ultimately serve to join together the individual cells of the resulting single-cell honeycomb structure 40 are preferably provided in pairs, as clearly shown in FIGS. 2–5. As will be readily appreciated with reference to the conceptual end view of the stack 44 illustrated in FIG. 5, the closely-spaced pairs of adhesive stripes 28 on the second face 24 of the material 14 ultimately serve to vertically join together each of the tubular cells of the resulting single-cell honeycomb structure 40. The closely-spaced pairs of adhesive stripes 28 on the material's second face 24 will further act to guide a drill bit or other suitable tool (not shown) when subsequently forming vertical passages 56 through the stack 44. The resulting vertical passages 56, an example of which is illustrated in the single-cell honeycomb structure 40 shown in FIG. 6, may thereafter receive draw cords with which to assist collapse of the resulting single-cell honeycomb shade. While such vertical passages 56 may be formed either before or after removal of the material 14 on the first side 46 of the stack 44, the vertical passages 56 are most preferably formed prior to the removal step so as to take advantage of the greater stability inherent to the pre-removal stack 44.

While the preferred method of practicing the invention has been disclosed, it should be appreciated that the invention is susceptible of modification without departing from the spirit of the invention or the scope of the subjoined claims. For example, while the adhesive stripes are preferably cured to permanently join the alternatingly folded lengths of the material 14 after accumulation within the batcher 42 and prior to removing the "d" ligaments from the stack's first side 46, the present invention contemplates removal of the "d" ligaments prior to the curing of the adhesive. In such a case, it will be appreciated that, although the staggered "cells" on the stack's first side will, as a technical matter, be "eliminated" prior to their formation, the desired single-cell honeycomb structure will be obtained upon the subsequent curing of the adhesive stripes.

I claim:

1. A method of making a cellular structure from a single continuous length of foldable material having a first face and a second face, said method comprising the steps of:

coating portions of both faces of the material with an adhesive in a predetermined pattern, said pattern including narrow stripes extending transversely to the length of the material;

folding the material upon itself in alternatingly opposite directions along fold lines extending transversely to the length of the material, said fold lines being positioned relative to said pattern to provide alternately folded lengths of the material separated by transverse folds, wherein adjacent pairs of alternately folded lengths of the material include one of said adhesive stripes on each face of the material, and wherein each adhesive stripe on the first face of the material is positioned substantially closer to the nearest fold line than each adhesive stripe on the second face of the material;

accumulating a stack of alternatingly folded lengths of the material, wherein alternating folds define a first side and a second side of said stack, respectively, and wherein alternatingly folded lengths of the material are joined together along said adhesive stripes to define a plurality of tubular cells on said first and second side of the stack, said cells extending transversely to the length of the material, each cell including one fold, the cells on the first side of said stack being substantially smaller than the cells on the second side of said stack; and removing alternatingly folded material from the first side of the stack adjacent the folds therein to thereby eliminate cells on said first side of the stack, whereby the remaining cells on the second side of the stack form the cellular structure.

2. The method of claim 1, wherein the portion of the alternatingly folded material adjacent to the folds therein removed from the first side of said stack during said removing step includes portions of the alternately folded lengths of the material extending from the folds on the first side of said stack to the nearest adhesive stripes on the first face of the material.

3. The method of claim 1, wherein said removing step includes the step of cutting off the first side of said stack with a cutting tool.

4. The method of claim 1, wherein said removing step includes the step of cutting said stack in a plane substantially parallel to the first side of said stack.

5. The method of claim 1, including the step of transversely creasing the material along the fold lines.

6. The method of claim 5, wherein said creasing step is performed prior to said folding step.

7. The method of claim 1, wherein said pattern includes a pair of narrow closely-spaced transverse stripes on one face of the material for each adjacent pair of alternatingly folded lengths of the material; and wherein said method further includes the step of forming a passage through said stack between said closely-spaced pairs of adhesive stripes, said passage being adapted to receive a draw cord for collapsing the cellular structure.

* * * * *